(12) United States Patent
Leistner et al.

(10) Patent No.: US 6,183,181 B1
(45) Date of Patent: Feb. 6, 2001

(54) SEALED END TEE-NUT

(75) Inventors: Herbert E. Leistner, Toronto (CA); Carlo Stagnoli, Curnasco di Treviolo (IT)

(73) Assignee: Sigma Tool & Machine, Toronto (CA)

( * ) Notice: Under 35 U.S.C. 154(b), the term of this patent shall be extended for 0 days.

(21) Appl. No.: 09/429,119

(22) Filed: Oct. 27, 1999

(51) Int. Cl.[7] .............................. F16B 37/04; F16B 37/14
(52) U.S. Cl. .................. 411/177; 411/180; 411/429; 411/82
(58) Field of Search ................ 411/180, 372.5, 411/372.6, 376, 429, 430, 431, 177, 82, 82.1

(56) References Cited

U.S. PATENT DOCUMENTS

| | | | |
|---|---|---|---|
| 3,280,875 | * 10/1966 | Fischer | 411/180 |
| 3,434,521 | * 3/1969 | Flora | 411/180 |
| 5,290,131 | * 3/1994 | Henriksen | 411/180 |
| 5,609,351 | * 3/1997 | Vermillion | 411/180 X |
| 5,673,927 | * 10/1997 | Vermillion | 411/180 X |
| 5,823,729 | 10/1998 | Nagayama | 411/429 |

* cited by examiner

*Primary Examiner*—Neill Wilson
(74) *Attorney, Agent, or Firm*—Ohlandt, Greely Ruggerio & Perle

(57) ABSTRACT

A Tee-nut fastener device having a tubular threaded sleeve and a flange around one end of the sleeve and a through bore extending from one end of the sleeve to the other, and a closure sealing the flange end of the sleeve while leaving the opposite end of the sleeve open.

11 Claims, 3 Drawing Sheets

SEALED END TEE-NUT

FIELD OF THE INVENTION

The invention relates to threaded fasteners of the type known as Tee-nuts having a threaded sleeve, and in particular to such Tee-nuts in which the one end of the Tee-nut sleeve is sealed closed against the entry of foreign matter.

BACKGROUND OF THE INVENTION

Threaded fasteners known as Tee-nuts, are in wide use, in a variety of industries. In general, they are formed out of sheet metal. A generally tubular sleeve is extruded or stamped out of the sheet metal, leaving a flange around one end of the sleeve, with both ends of the sleeve being open. Usually the interior of the sleeve is threaded to receive a threaded fastener. In many cases, some form of anti-rotation means are provided in the form of prongs extending downwardly more or less at right angles to the plane of the flange.

Such Tee-nuts are widely used especially, for example, in the furniture industry where many such Tee-nuts may be embedded in wooden work pieces so that the pieces of furniture may be assembled and secured together. However, new uses for such Tee-nuts are constantly emerging. It is now found that such Tee-nuts can be advantageously used both in wood and in molded products. Where the embedment material or receiving material is formed of a flowable moldable material a Tee-nut has many advantages. Such moldable materials may, for example, include thermoplastics and rubber or synthetic rubber like compounds, and a variety of other such flowable moldable materials.

In these cases it is found useful to embed the Tee-nuts in the flowable material, so that after molding is complete the Tee-nuts are located in the molded article at various spaced locations.

It has been found, however, that during the molding operation, there may be a tendency for the flowable material to flow into the interior of the threaded sleeve of the Tee-nut. This will then impair the usefulness of the Tee-nut as a fastening socket to receive a fastener.

A further advantage of the invention is that the sealed end will prevent moisture and contaminants from entering the Tee-nut, whether it is used in a flowable material, or whether it is used typically in a wooden workpiece or the like.

Usually during the molding operation the flanged end of the Tee-nut will be embedded at a certain depth in the molded article, with the other end of the sleeve, ie. the end of the sleeve remote from the flange being open at the surface of the molded article to receive a threaded fastener. It has been found to be desirable to exclude the flowable material from the flange end of the sleeve in order to permit effective use of the threaded sleeve for receiving fasteners in the finished article.

BRIEF SUMMARY OF THE INVENTION

With a view to addressing these problems, the invention comprises a Tee-nut fastener device comprising a tubular threaded sleeve and a flange around one end of the sleeve and a through bore extending from one end of the sleeve to the other, and a closure sealing the flange end of the sleeve while leaving the opposite end of the sleeve open.

In one embodiment, a disk of metal is welded to the flange, in registration with the flange end of the sleeve.

In another embodiment, the flange end of the sleeve is formed with an annular well and a plug-like disk-shaped plug is received in the well and is secured by any suitable means such as welding or other fastening.

In another form of the invention, a closure panel is secured over the top of the flange completely covering the open end of the sleeve.

In order to prevent rotation of the Tee-nut in the molded article, some form of anti-rotation means are formed preferably on the flange so that the flowable material flows around the anti-rotation means and prevents rotation of the Tee-nut. Such anti-rotation means may be in the form of typical prongs. They may also be in the form simply of end tabs on the flanges. They may also be in the form of grooves or recesses stamped into the flanges on the Tee-nut. The flanges themselves may be made in irregular shapes so that the moldable material flows around them and also prevents rotation of the Tee-nut.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1 a perspective illustration of a sealed end Tee-nut, partially exploded, to reveal construction;

DESCRIPTION OF A SPECIFIC EMBODIMENT

Figure 1:
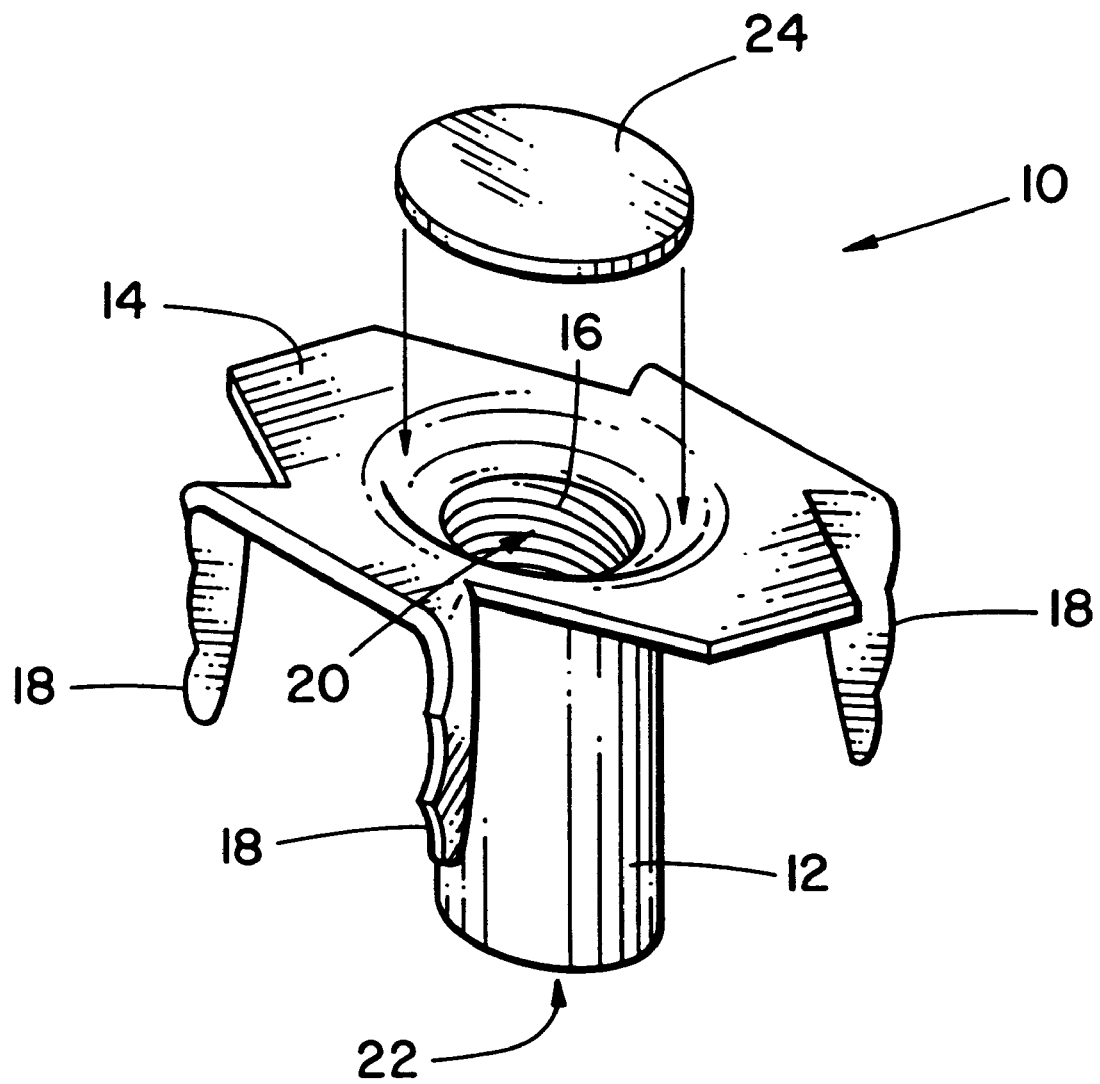
Figure 2:
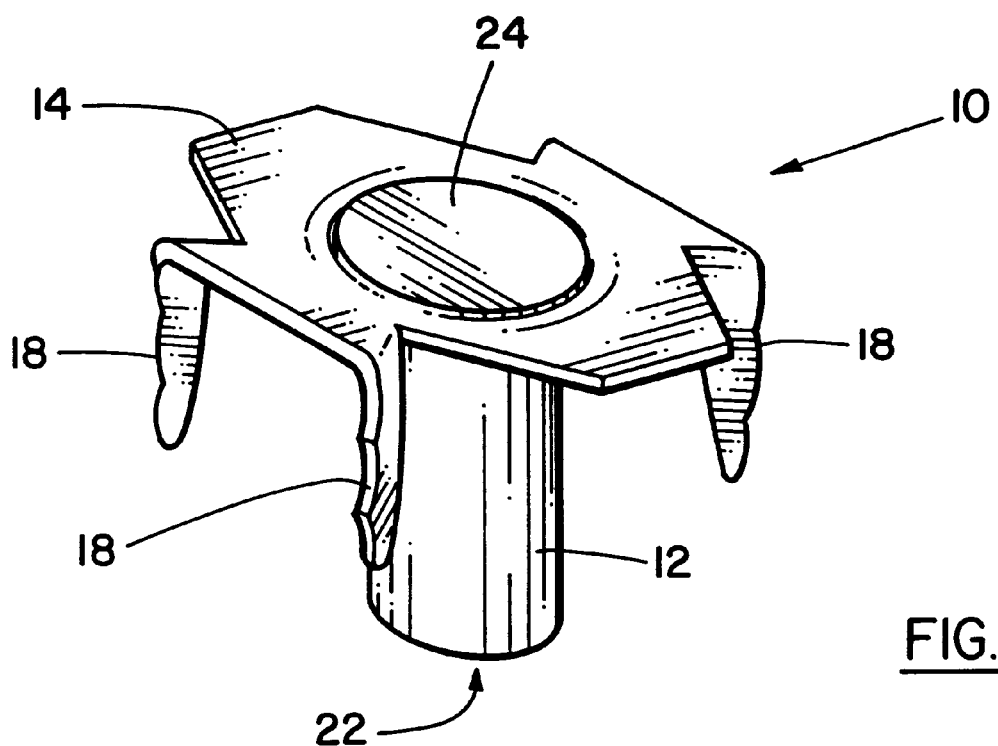
FIG. 2 is a perspective illustration corresponding to FIG. 1 showing the sleeve end seal in position.

Referring now to FIGS. 1 and 2, it will be seen that the invention is there illustrated in the form of a typical Tee-nut indicated generally as 10. It will be appreciated that while this is a showing of a typical Tee-nut such as is used in the trade at the present time, many various may be made to the Tee-nut in order to adapt it more suitably to use on in-place molding in molded articles.

The showing, therefore, of a typical Tee-nut in these two illustrations is merely by way of example and without limitation.

The Tee-nut indicated generally as 10 comprises a tubular sleeve and a flange 14, the plane of which is more or less normal to the central axis of the tube. In this particular case, the flange 14 is of more or less irregular octagonal shape, being stamped out of a piece of sheet metal.

The interior of the sleeve 12 is threaded as at 16. Anti-rotation devices in this case prongs 18, are stamped out of the edges of the flange 14. These are typical features of the basic Tee-nut such is well known in the art and have been in use for many years. In, for example, the furniture industry, numerous such Tee-nuts are embedded in a wooden workpiece, and threaded bolts (not shown) are passed through furniture components and are then secured within the threads 16 and the sleeve 12. The flange 14 functions as a securing means for preventing the sleeve 12 from pulling out of the workpiece, and the prongs 18 function to prevent rotation of the Tee-nut as the threaded fastener is driven in.

As already explained, however, in the new use of the Tee-nut that has been developed, the Tee-nuts are embedded in a molded article, which is formed of a flowable, moldable material, which then sets hard, embedding the Tee-nut into the material.

It will be seen that the sleeve 12 has a flange end 20 and a free end 22 remote from the flange end 20 and defines a through base. The flange 14 and the flange end 20 are totally encased within the molded article. The sleeve free end 22 however, extends to the surface of the molded article so as to allow threaded fasteners to be secured in the molded article by screwing them into the interior of the sleeve 12. In order to do this, it is desirable to keep the interior of the sleeve 12 clear of molded material.

Figure 3:
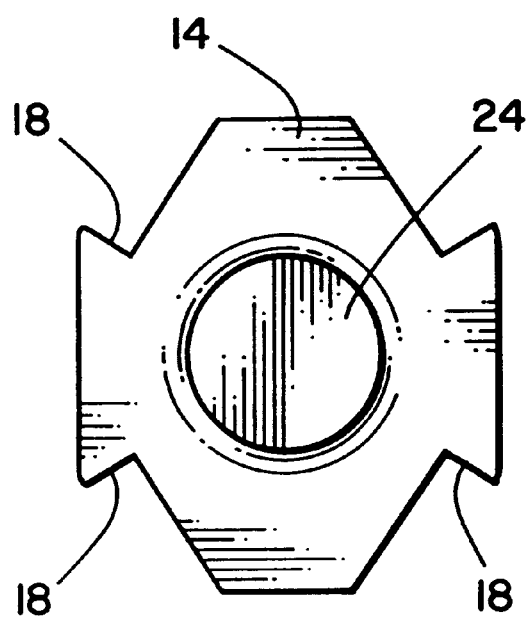
FIG. 3 is a top plan view of the sealed end Tee-nut in FIG. 2.

If this is not done, it is found that the molded material, when in its flowable state, will flow in through the flange end 20 and partially occlude the sleeve 12. In order to prevent this, a seal closure disk 24, in this embodiment, is secured to the flange 14 in registration with the flange end 20 of the sleeve 12. Typically, the seal closure 24 will be made of sheet metal, and the closure 24 will be welded to the flange 14 around the open end 20. In this way, a sealed end Tee-nut is produced having the appearance shown in FIGS. 2 and 3.

Figure 4:
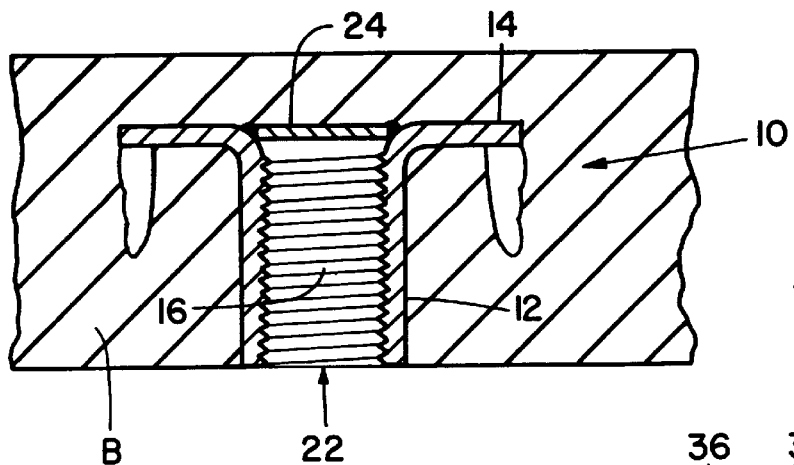
FIG. 4 is a section through a typical molded body of a molded article showing a sealed end Tee-nut embedded in a molded body.

When the sealed end Tee-nut is placed in a form or mold for molding a moldable article, and when the flowable material flows into the mold, it will be unable to enter the flange end 20 of the sleeve 12, and the sleeve 12 will thus be left free of molded material. FIG. 4 illustrates the typical location of the sealed end Tee-nut shown embedded in molded body indicated generally as "B". In the embodiments of FIGS. 1 through 4, the closure seal 24 is shown simply positioned in the radiused open-mouth of the flange opening 20. The actual weld holding the closure 24 in position is shown merely by shading around the edges of the disk 24.

Figure 5:
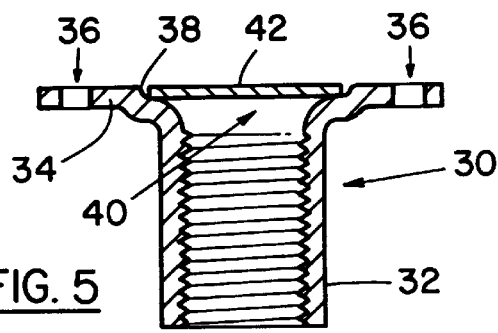
FIG. 5 is a sectional illustration of a further embodiment of the invention.

In accordance with another embodiment of the invention, as shown in FIG. 5, the modified Tee-nut 30 may comprise the sleeve 32 and flange 34. In this case, the anti-rotation means will be in the form of holes or openings 36 formed in the flange 34, through which moldable material may flow and thus secure the entire Tee-nut against rotation.

In this embodiment also, there is illustrated a generally annular well 38 which forms a depression in the flange 14 around the flange end opening 40. The seal closure 42 in this case is of somewhat greater diameter than in the embodiment of FIG. 4, and is received in the well 38, and is again secured therein by, for example, welding or other suitable means.

Figure 6:
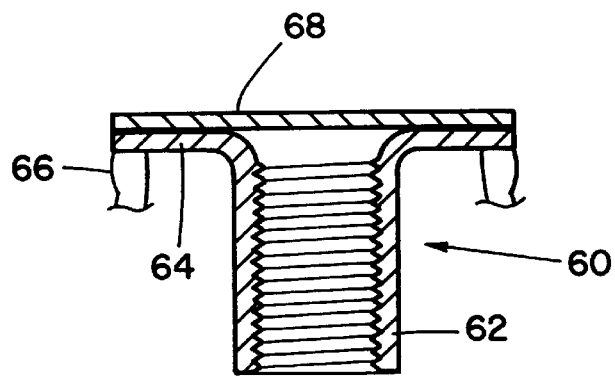
FIG. 6 is a sectional view showing a further embodiment of the invention.

A further embodiment of the invention is illustrated in FIG. 6. In this case, a Tee-nut indicated generally as 60 and has a sleeve 62 and a flange 64. In this case, anti-rotation means are formed simply by end flanges bent downwardly from either end of the end flanges 66 which are bent downwardly from either end of the flange 64.

In this embodiment, the closure seal, shown as 68, comprises a panel of sheet metal which substantially matches the shape and size of the flange 64 and is simply secured thereto by any suitable means such as welding.

Figure 7:
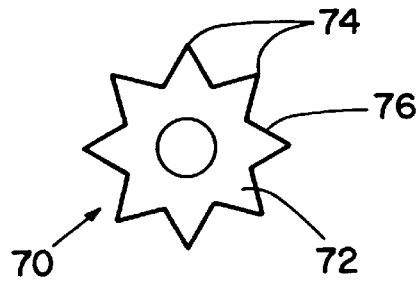
FIG. 7 is a top plan view showing an alternative form of the invention with a star-shaped flange.

FIG. 7 illustrates another embodiment of Tee-nut indicated generally as 70. In this case, the flange 72 is formed with a generally serrated edge, defining points 74 and recesses 76. The points and recesses forming the serrations are secured within the molded material in which the Tee-nut is embedded. The flowing of the material into the recesses 76 effectively locks the points 74 in position and prevents rotation.

Figure 8:
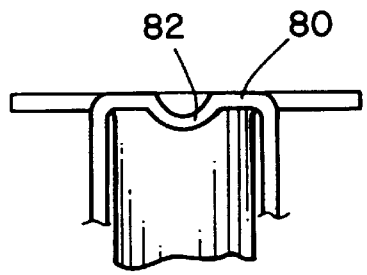
FIG. 8 is an end view of a tee-nut showing on e form of indentation in the flange.

A further embodiment of the invention is shown in FIG. 8. In this case, all that is shown is a flange indicated as. 80. The flange is formed with one or more semi-cylindrical or other shaped depressions 82. The flow of the molded material during molding into and around the recessed portion will effectively prevent rotation.

Figure 9:
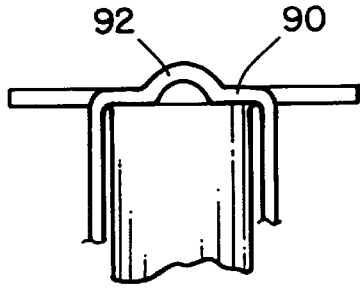
FIG. 9 is an end view of a tee-nut, corresponding to FIG. 8, but showing a different form of indentation.

Similarly, FIG. 9 shows a corresponding embodiment, in which a flange 90 is formed with an upset arch 92, which may be of similar shape to the depression 82 or of a different shape, the exact shape not being material. It will function the same way namely to embed itself in the molded material and prevent rotation.

While the invention is described and illustrated, as being used in a in an article made of moldable, flowable material, the Tee-nut can also be used in conventional application such as in a wooden workpiece where the Tee-nut is driven into a pre-drilled hole in the workpiece.

In this case, the hole drilled in the workpiece would extend completely through it, and the Tee-nut would simply be inserted from one end of the hole, leaving the free end of the sleeve in the hole in the workpiece, ready to receive a bolt or other fastener.

The foregoing is a description of a preferred embodiment of the invention which is given here by way of example. The invention is not to be taken as limited to any of the specific features as described, but comprehends all such variations thereof as come within the scope of the appended claims.

The embodiments of the invention in which an exclusive property or privilege is claimed are defined as follows:

1. A Tee-nut fastener device comprising:
   a metal stamping having a tubular threaded sleeve and a flange around one of the pair of ends of the sleeve;
   anti-rotation means being formed on the flange;
   a through bore extending from one of the pair of ends of the sleeve to the other of the pair of ends, and a closure for sealing the end of the sleeve adjacent the flange while leaving open the other end of the sleeve open, the closure being secured to the flange in registration with the end of the sleeve adjacent the flange.

2. The Tee-nut as claimed in claim 1, wherein the closure is a metal disc welded to the flange, in registration with the end of the sleeve adjacent the flange.

3. The Tee-nut as claimed in claim 1, wherein the end of the sleeve adjacent the flange is formed with an annular well, and wherein the closure is a disk-shaped plug received in the well and secured by any suitable means.

4. The Tee-nut as claimed in claim 1, wherein the closure is a closure panel secured to the flange covering substantially all of flange.

5. The Tee-nut as claimed in claim 1, wherein the end adjacent the flange, the anti-rotation means and the closure are encased within an article made of moldable materials such that the moldable material is molded around the anti-rotation means and prevents rotation of the Tee-nut.

6. The Tee-nut as claimed in claim 1, wherein the anti-rotation means is in the form of prongs.

7. The Tee-nut as claimed in claim 1, wherein the anti-rotation means is in the form of end tabs on the flange.

8. The Tee-nut as claimed in claim 1, wherein the anti-rotation means is in the form of grooves or recesses stamped into the flange of the Tee-nut.

9. The Tee-nut as claimed in claim 1, wherein the anti-rotation means is in the form of one or more openings stamped into the flange of the Tee-nut.

10. The Tee-nut as claimed in claim 1, wherein the anti-rotation means is in the form of one or more depressions stamped into the flange of the Tee-nut.

11. The Tee-nut as claimed in claim 1, wherein the anti-rotation means is in the form of one or more upset arches stamped into the flange of the Tee-nut.

* * * * *